(No Model.)

A. P. PALMER & H. L. PHELPS
CLUTCH.

No. 503,984. Patented Aug. 29, 1893.

WITNESSES:
H. A. Carhart
E. B. Kinne

INVENTORS:
Arthur P. Palmer &
Homer L. Phelps
By Smith & Denison ATTORNEYS.

UNITED STATES PATENT OFFICE.

ARTHUR P. PALMER AND HOMER L. PHELPS, OF ATHENS, PENNSYLVANIA.

CLUTCH.

SPECIFICATION forming part of Letters Patent No. 503,984, dated August 29, 1893.

Application filed November 28, 1892. Serial No. 453,307. (No model.)

*To all whom it may concern:*

Be it known that we, ARTHUR P. PALMER and HOMER L. PHELPS, of Athens, in the county of Bradford, in the State of Pennsylvania, have invented new and useful Improvements in Clutches, of which the following, taken in connection with the accompanying drawings, is a full, clear, and exact description.

Our invention relates to ratchet clutches, and our object is to produce a simple and effective ratchet clutch comprising a spring actuated ball, adapted to reciprocate in its seat in a hub or other bearing, and intermittently engage with one of a series of countersinks in the periphery of the shaft or axle, when such shaft is rotated in one direction, and to become automatically disengaged when the shaft is rotated in the opposite direction, by rolling or being rolled out of said depression onto the face of said shaft, in order that, when so engaged the forward rotation of said shaft will drive the mechanism to which it is connected, while it can be freely rotated backward without actuating said mechanism.

Our invention consists in the several novel features of construction and operation hereinafter described and which are specifically set forth in the claim hereunto annexed. It is constructed as follows, reference being had to the accompanying drawings, in which—

Figure 1:
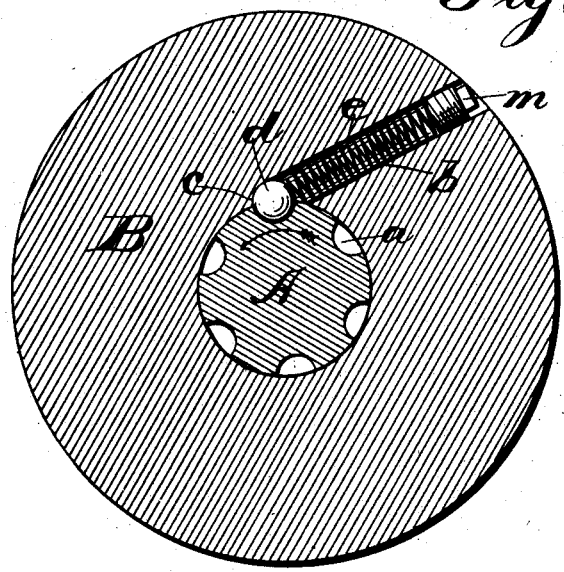
Figure 2:
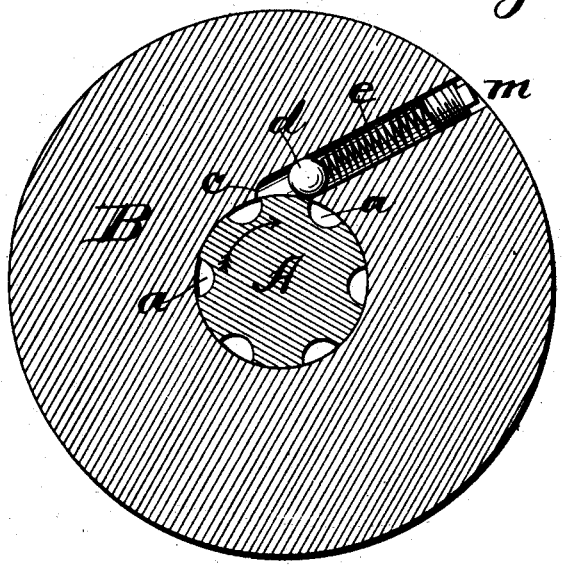

Figure 1, is a transverse section of a shaft or axle, and a hub or bearing receiving it, and also showing the clutch or ratchet mechananism in elevation and in engagement with the shaft. Fig. 2, is a like view of the same parts, showing the clutch disengaged.

A—, is a shaft or axle provided with one or more countersinks —a— in its outer face or periphery.

B—, is the hub of a wheel (for illustration) provided with a tubular recess —b—, the center line of which is tangential to the opening therein which receives the shaft or axle, thereby creating the shoulder —c— at its inner end, the curvature of the face of said shoulder being substantially concentric with the circle of the countersinks —a— in the shaft.

In the recess —b— a ball or sphere —d— is placed fitting loosely; and —e— is a spring bearing inwardly against the ball, and outward against the threaded plug —m— inserted into the recess and by which the tension of said spring upon the ball is adjusted.

In Fig. 1, when the shaft or hub is rotated in the direction of the arrow, the ball will lie partly in a countersink in the axle and partly in the hub and will bear also against the shoulder —c—, and will thus lock the hub and shaft together and cause both to rotate simultaneously in the same direction.

In Fig. 2, the rotation of one member in the direction of the arrow thereon, will roll the ball out of the countersink and outwardly in the recess, so that it will bear and roll upon the face of the shaft or axle, and no longer connect the members, so that one can rotate in that direction entirely independent of the other.

What we claim as our invention, and desire to secure by Letters Patent, is—

A clutch mechanism comprising a member provided with countersinks in its outer face, in combination with another member having a tubular recess, the center line of which is tangential to the other member, a shoulder in said member at the inner end of said recess, a ball in said recess of equal radius to that of the countersinks, and with which said shoulder engages when the ball enters a countersink, a spring in said recess engaging with said ball, and means to adjust the tension of the bearing of said spring upon the ball.

In witness whereof we have hereunto set our hands this 18th day of November, 1892.

ARTHUR P. PALMER.
HOMER L. PHELPS.

In presence of—
JOSEPH HINES,
LOUIS E. HOYT.